Oct. 3, 1950     L. G. H. CANTLE     2,524,650
APPARATUS FOR TESTING THE BALANCE OF ROTATING BODIES
Filed June 10, 1946     2 Sheets-Sheet 1

Oct. 3, 1950        L. G. H. CANTLE        2,524,650
APPARATUS FOR TESTING THE BALANCE OF ROTATING BODIES
Filed June 10, 1946        2 Sheets-Sheet 2
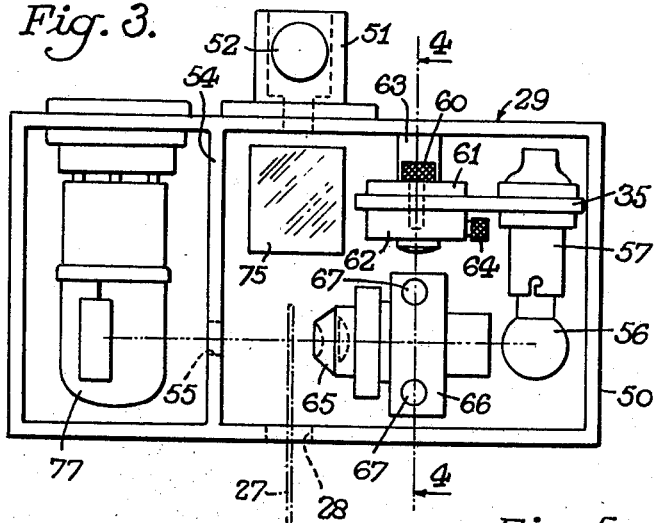
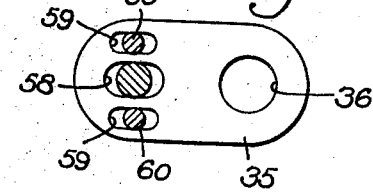
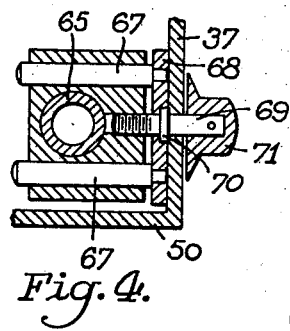
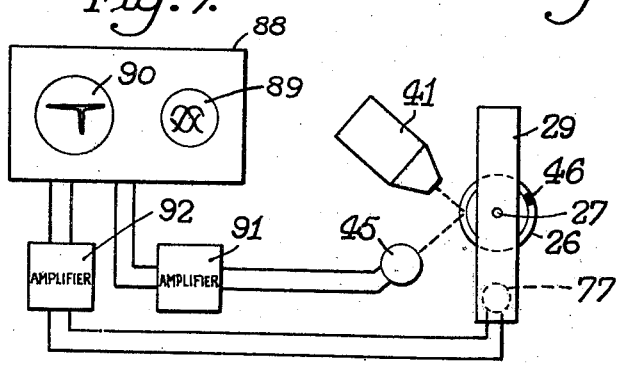
Inventor
Leicester Gordon Heath Cantle
by Stevens, Davis & Miller
his attorneys Patented Oct. 3, 1950

2,524,650

UNITED STATES PATENT OFFICE 2,524,650

APPARATUS FOR TESTING THE BALANCE OF ROTATING BODIES

Leicester Gordon Heath Cantle, Surbiton, England, assignor to Reid and Sigrist Limited, Kirby Muxloe, near Leicester, England Application June 10, 1946, Serial No. 675,598
In Great Britain July 11, 1945

1 Claim. (Cl. 73—66)

This invention relates to apparatus for testing the balance of rotating bodies, and it has for its object to provide an improved apparatus by which bodies such as gyroscope rotors may be quickly and accurately measured with respect to the magnitude and angular position of an out-of-balance force as the rotor is turning, usually at its operating speed. With this information the requisite adjustment can easily be made to bring the rotating body into perfect or substantially perfect dynamic balance.

Thus, in testing the balance of rotating bodies, it is not only desired to determine the amount by which the rotating body is out of balance, but also to determine the angular position of the more massive part, or in other words the angular position of the plane containing both the axis of rotation and the centre of gravity. The lack of balance of such rotating bodies as gyro wheels, fly wheels and the like is usually corrected by removing material near the periphery of the wheel and this is necessarily a matter of trial and error especially so far as the amount of material to be removed is concerned. The procedure is greatly simplified, however, if the exact position on the periphery from which the material is to be removed can be determined, and also the amount to be removed.

It has been proposed to measure the phase difference between an alternating current generated by vibratory movement due to lack of balance of the rotating body, and another alternating current generated by means of a beam of light interrupted periodically by the rotation of the body and a photosensitive device on which the interrupted beam of light falls. For generating the first-mentioned alternating current it has been proposed to employ devices operating in the manner of gramophone pick-ups of the electromagnetic, electrostatic or piezo-electric type.

According to the invention, in an apparatus for testing the balance of a rotating body, a device is provided for producing an electric current which pulsates in synchronism with oscillations of the rotating body due to out-of-balance force, which device comprises a source of light, means for bringing a beam of light from said source to a focus at a position in space, a photo-electric cell disposed in the path of the beam beyond the focus position, indicator means operated by the photo-electric cell, an occulting member which is disposed substantially at the focus position and means connecting the occulting member with the rotating body so that the out-of-balance force moves the occulting member across the beam at the focus position, thereby cyclically cutting off light from the photo-electric cell in sympathy with the rotation of the out-of-balance force. Conveniently the light source and the photo-electric cell form a unit which is angularly adjustable about the occulting member; thus the source of light and the photo-electric cell may be disposed within a casing which is mounted for angular movement about a vertical axis. The occulting member preferably comprises a wire projecting upwards through a hole in the bottom of the casing. If desired the light beam may be arranged to pass through a lens, which latter is mounted to be movable in a direction laterally of the beam so as to adjust the beam with respect to the occulting member. Preferably an adjusting means for moving the lens laterally is operable from the outside of the casing when the latter is closed, while a reflecting device, such as a prism, is disposed within the casing in line with the occulting member and with an opening in a vertical wall of the casing so as to allow endwise examination of the occulting member by viewing in a substantially horizontal direction.

The invention is illustrated by way of example in the accompanying diagrammatic drawings, in which:

Figure 3 is a front elevation of the finder unit which produces an alternating current from the out-of-balance oscillation of the rotor, drawn to an enlarged scale the cover plate being omitted;

Figure 4 is a fragmentary sectional elevation of the adjustable condenser mounting, taken on the line 4—4 of Figure 3;

Figure 5 is a plan of the lamp-supporting bracket in Figure 3;

Figure 6 is a diagram showing in plan the action of the occulting member;

Figure 7 is a diagram of the associated electrical indicating equipment; and

Figure 1:
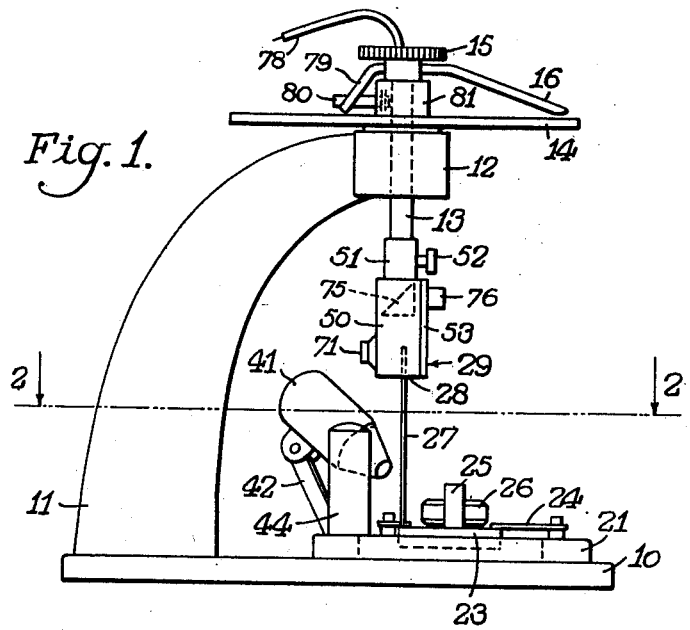
Figure 1 is a side elevation of an apparatus primarily intended for use in the balancing of rotors belonging to gyroscopic navigating instruments.
Figure 2:
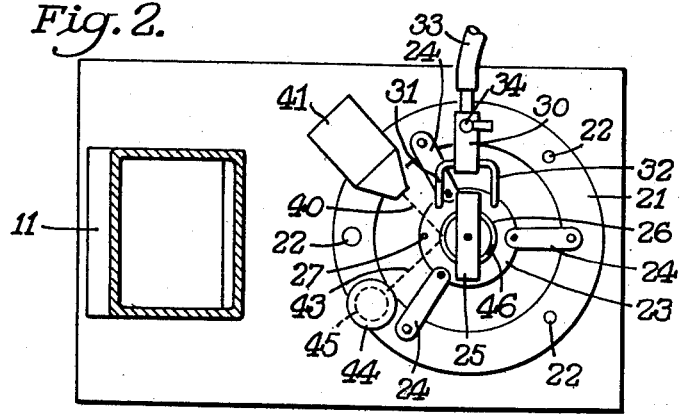
Figure 2 is a sectional plan taken on the line 2—2 of Figure 1.

The apparatus shown primarily in Figures 1 to 3 comprises a heavy base 10, having a rigid bracket 11 extending upwards from its rear part, said bracket carrying a bearing 12 for a tubular spindle 13 arranged to be freely rotatable about a vertical axis. A circular scale plate 14 is attached to the bracket 11 and has its upper surface graduated circumferentially in angular divisions, such as degrees, so as to show the position of the spindle 13; for enabling the spindle 13 to be turned it is provided with a knob 15, while a pointer 16 indicates its position on the scale plate 14.

A ring 21 is attached to the upper surface of the base 10, say by three non-uniformly spaced studs 22 and supports a circular carrier member 23 adapted to receive the rotor 26 requiring to be tested. The carrier 23 has to be resiliently mounted so that it can respond to out-of-balance forces in the rotor, and therefore it is connected with the ring 21 by three radial strips 24 of thin spring steel, preferably arranged with their upper surfaces coplanar with the under surface of the rotor 26. The carrier 23 is hollowed or otherwise arranged to receive the normal gimbal frame 25 within which the gyro rotor 26 is intended to run, thus avoiding any necessity to dismantle the rotor bearings after the final test has been made. The gimbal frame 25 is of course firmly attached to the carrier member 23 and therefore the latter is caused to rock circular-wise when the spinning rotor 26 is not in perfect balance. This movement is shared by an occulting member in the form of a stem 27 comprising a stiff wire of relatively small diameter, which is rigidly attached to the carrier member 23 and extends upwards, its top part projecting with substantial clearance through an aperture 28 (see Figure 3) in the bottom of a finder unit indicated generally at 29. Thus as the carrier member 23 rocks the upper end of the stem 27 moves horizontally round a small orbit which is usually somewhat circular, i. e. it vibrates with an orbital motion.

The rotor 26 is intended to be driven by an air jet, its circumference being formed with the usual bucket recesses; therefore the testing device is provided with an air jet device 30 having a pair of nozzles 31 and 32, either one of which can be fed with compressed air from a supply pipe 33 by suitably operating a change-over valve 34. This enables the gyro-rotor 26 to be driven in its proper working direction when the gimbal frame 25 is inverted, for it is usual to test both ends of the rotor in turn in order to produce complete balance.

For enabling the speed of the rotor 26 to be readily ascertained and also to provide a reference indication for phase measurements, an incident beam of light, indicated at 40, is continuously directed on to the rim of the rotor 26 by a projector lamp unit 41, conveniently mounted upon the ring 21 by means of a universally adjustable bracket 42 (see Figure 1). The rotor 26 is arranged to reflect the incident beam 40, as indicated at 43, into a photo-electric unit 44 containing a photo-electric cell 45; by making the circumference of the rotor non-uniformly reflective, such as by providing at one point a dark spot or a polished portion, the photo-electric cell 45 can be caused to produce (in conjunction of course with the requisite amplifying apparatus) a datum alternating current or E. M. F. which is in perfect step with the rotor, and which has a definite phase relationship therewith. In Figure 2 the rotor 26 is shown with a dull black spot 46. Where the apparatus is used for balancing rotors of different patterns and/or sizes, a number of interchangeable rings 21 are provided, each adapted to fit upon the studs 22 and being arranged to hold the air jet device 30, the projector 41 and the photo-electric cell unit 41 in their appropriate positions, and each having its carrier 23 and springs 24 suitably designed for the rotor 26 and gimbal frame 25 concerned.

The construction of the finder unit 29 for producing a corresponding alternating current or E. M. F. from the out-of-balance movements of the wire 27 is shown in Figure 3. It comprises a casing 50 having at its upper part a socket 51 which is secured to the spindle 13 by a set screw 52. The casing is closed at its front by a door 53 (see Figure 1) which is omitted from Figure 3, the interior of the casing being divided into two compartments by a partition 54 having an aperture or window 55 adjacent its lower part. The bottom of the casing 50 also has the aperture 28 through which the wire 27 extends with considerable freedom in all directions. An electric lamp bulb 56 is carried by a holder 57 which latter is mounted so as to be adjustable, within limits, in any direction; this is conveniently effected by providing a plate 35 which is shaped as shown in Figure 5. A hole 36 accommodates the lamp holder 57 while at its opposite end it is formed with a central slot 58 and two outer slots 59; these accommodate screws 60 by which the plate is clamped between collars 61 and 62. The collars 61 and 62 are slidable vertically and are also rotatable upon a stem 63 which extends downwards from the top of the casing 50 and passes through the slot 58, the lower collar 62 being clamped in position on the stem 63 by a set screw 64. Light from the lamp 56 is brought to a focus at a position adjacent the wire 27 by means of an objective 65 which is mounted in a block 66. It is important that the beam of light should be finely adjustable laterally in a horizontal direction relative to the wire 27 and therefore the block 66 carrying the objective is mounted on a pair of slide bars 67 extending forwardly from a plate 68 secured to the back 37 of the casing 50, as is shown in Figure 4. A spindle 69, having a flange 70 which is freely rotatable within, but axially located by, a recess in the plate 68, is provided upon its outer end with an adjusting knob 71, while its inner end is finely screw-threaded for engagement with the block 66; thus rotation of the external knob 71 causes the block 66 to slide on the bars 67, carrying with it the objective 65. The position of the light beam in relation to the wire 27 can be readily inspected when required owing to the provision of an optical prism 75 which is mounted within the casing 50 as is shown in Figure 1. An inspection opening, conveniently in the form of a tube 76, is provided in the door 53 just in front of the prism 75 so that the operator can obtain a top view of the wire 27 and the light beam by looking horizontally into the tube 76. The left-hand compartment of the casing 50 contains a photo-electric cell 77 upon which the light beam from the objective 65 impinges after having passed beside the wire 27 and through the aperture or window 55. The electrical connections from the lamp 56 and photo-electric cell 77 pass out of the casing 50 through the socket 51 and thence extend axially along the spindle 13 which is tubular; the connections are indicated at 78 in Figure 1 where they issue from the top of the said spindle 13. In order to prevent the connections 78 from being unduly twisted due to continued rotation of the spindle, the movements of the latter are restricted to a little more than one complete turn by the provision of an arm 79 which extends from the knob 15 and engages with a stop member 80. This stop member is fitted with freedom into the boss 81 of the dial plate 14, and is pivotally connected therewith so that it can swing horizontally through a limited angle of say 20°, thus, starting from one extreme position the knob 15 and pointer 16 can be turned through an angle of several degrees more than 360°, the arm 79 carrying the stop member 80 with it for the last part of the movement.

When the apparatus is in operation, the wire 27 constituting the occulting member obstructs the light beam in the manner illustrated in Figure 6, which is a diagram of the parts viewed from above. It will be seen that, in its normal stationary position, the wire is disposed just in front of the light beam 85 at its focus, indicated at 86, so that the whole of the beam is able to reach the photo-electric cell 77. When the wire 27 moves in an orbit indicated in broken lines at 87, the wire 27 passes into the beam 85 once for each revolution and thus momentarily intercepts some at least of the light which would otherwise reach the photo-electric cell 77. This of course affects the electrical output from the cell 77 and by the use of the appropriate filters and amplifying apparatus can readily be converted to an alternating current or E. M. F. which is controlled by the orbital movements of the wire 27. It will be seen that the phase of this current or E. M. F. in relation to the reference current or E. M. F. produced by the photo-electric cell 45, can be changed to any angle by adjusting the angular position of the finder unit 29 through the medium of the knob 15 and spindle 13. It should be mentioned that such rotation takes place precisely about the axis of the wire 27 when the latter is in its normal stationary position, so that the alternating current or E. M. F. derived from the photo-electric cell 77 only has its phase changed when such rotational adjustment is made. The two alternating currents or E. M. F.'s derived from the photo-electric cells 45 and 77 are fed to any convenient known apparatus for measuring or indicating the difference in phase, thus enabling the direction of the out-of-balance force on the rotor 26 to be determined by taking the reading from the scale plate 14 and transferring the angle to the rotor 26 using the position of the dark spot 46 as a datum. The apparatus can, of course, be calibrated initially by noting the readings when a mass is attached at a predetermined point to a rotor which is already perfectly balanced. The preferred form of phase measuring apparatus is indicated diagrammatically in Figure 7 and comprises an indicating unit 88 incorporating two oscillograph screens 89 and 90. The screen 89 is for indicating the speed of the rotor 26 by comparison with a reference frequency, say that of the ordinary A. C. supply; it is operated by the alternating current derived from the photo-electric cell 45 and is therefore unaffected by the adjusting movements of the finder unit 29. The screen 90 is fed with the two alternating currents derived from both photo-electric cells 45 and 77, these interacting in the known manner to produce a pattern which has a predetermined shape for a given difference in phase. Thus by causing one of the currents to bring about deflection along the X axis and the other along the Y axis the screen 90 can be caused to show normally a substantially T-shaped trace, which however breaks into an almost perfect rectangle when the alternating currents have a phase difference of exactly 90°. The usual amplifiers belonging to the photo-electric cells 45 and 77 are indicated at 91 and 92 respectively. In Figure 7 the wire 27 is regarded as being mounted upon the gimbal frame (not shown) at a position coaxial with the rotor 26, the finder unit 29 being adjustable angularly also about the axis of the rotor 26.

Figure 8:
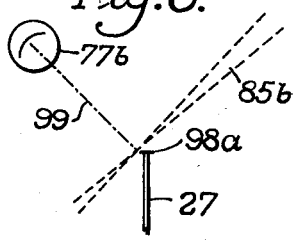
Figure 8 is a diagram indicating an alternative arrangement.

It will be understood that the apparatus which has been described is given only by way of example and that the out-of-balance force of a spinning rotor can be caused in other ways to produce a phase indication through the medium of a beam of light which is occulted. Thus in the arrangement shown in Figure 8 a beam 85b is projected obliquely downwards past a very small mirror 98a mounted in a horizontal position upon the wire 27; the photo-electric cell 77b is disposed as shown so that when the wire 27 moves to the left in making its orbital movements, the mirror 98a intercepts the beam and reflects it upwards on to the photo-electric cell 77b as indicated by the broken line 99. In this instance the mirror 98a constitutes the occulting member.

Other means may be employed for obtaining the datum alternating current, instead of the lamp unit 41 and photo-electric unit 44, as such devices are well known in the art.

The improved apparatus can be used for the balancing of various types of rotors other than those for gyroscopes, and it is especially suitable for the armatures of motors and other electrical apparatus.

What I claim is:

In an apparatus for testing the balance of a rotating body, a device for producing an electric current which pulsates in synchronism with oscillations of the rotating body due to out-of-balance force, which device comprises a casing mounted for angular movement about an axis which intersects said casing, a light source within said casing, means for focussing a beam of light from said source at a position within said casing substantially on said axis, a photo-electric cell disposed also within said casing and at a position to receive the beam of light beyond the focus position, an occulting member which is disposed substantially at the focus position and means connecting the occulting member with the rotating body so that the out-of-balance force moves the occulting member across the beam at the focus position, thereby cyclically cutting off light from the photo-electric cell in sympathy with the rotation of the out-of-balance force, angular movement of the casing about its mounting axis causing the phase of the electric current to be varied, and a reflector disposed obliquely within said casing so as to be intersected by the mounting axis of the casing and thus provide a view of the occulting member in a direction substantially along the mounting axis of the casing for use in adjusting the relationship of the focus position and the occulting member.

LEICESTER GORDON HEATH CANTLE.

REFERENCES CITED

The following references are of record in the file of this patent:

UNITED STATES PATENTS

| Number | Name | Date |
|---|---|---|
| 2,243,458 | Esval et al. | May 27, 1941 |
| 2,290,606 | Burnett | July 21, 1942 |
| 2,343,063 | Kent | Feb. 29, 1944 |
| 2,344,753 | Van Degrift | Mar. 21, 1944 |
| 2,381,645 | Carlstein | Aug. 7, 1945 |

FOREIGN PATENTS

| Number | Country | Date |
|---|---|---|
| 496,584 | Germany | Apr. 28, 1930 |
| 629,855 | Germany | May 14, 1936 |